United States Patent
Uotani et al.

(10) Patent No.: US 9,465,868 B2
(45) Date of Patent: Oct. 11, 2016

(54) INFORMATION OUTPUT DEVICE

(75) Inventors: Kazushi Uotani, Kobe (JP); Masahito Matsumoto, Kobe (JP); Makoto Oi, Kobe (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/384,607

(22) PCT Filed: Apr. 25, 2012

(86) PCT No.: PCT/JP2012/061070
§ 371 (c)(1),
(2), (4) Date: Sep. 11, 2014

(87) PCT Pub. No.: WO2013/161020
PCT Pub. Date: Oct. 31, 2013

(65) Prior Publication Data
US 2015/0066354 A1 Mar. 5, 2015

(51) Int. Cl.
*G01C 21/30* (2006.01)
*G01C 21/32* (2006.01)
(Continued)

(52) U.S. Cl.
CPC ......... *G06F 17/30752* (2013.01); *G01C 21/00* (2013.01); *G06F 17/3053* (2013.01); *G06F 17/3087* (2013.01); *G06F 17/30241* (2013.01); *G06F 17/30997* (2013.01)

(58) Field of Classification Search
CPC ............... G06F 17/3087; G06F 17/30997; G06F 17/30241; G06F 17/3053; G06F 17/30752; G06Q 50/00; G01C 21/00

USPC ............... 701/400, 408, 409, 410, 418, 425
See application file for complete search history.

(56) References Cited

U.S. PATENT DOCUMENTS 7,490,342 B2 * 2/2009 Echigo ................... H04L 29/06
725/120
7,640,241 B2 * 12/2009 Wako ................ G06F 17/30017
(Continued)

FOREIGN PATENT DOCUMENTS

AU WO 2012174590 A1 * 12/2012 ............. G08G 1/017
JP 8-105751 A 4/1996
(Continued)

OTHER PUBLICATIONS

"SiriusXM Travel Link® Overview", http://www.siriusxm.com/travellink.

Primary Examiner — Jaime Figueroa
(74) Attorney, Agent, or Firm — Birch, Stewart, Kolasch & Birch, LLP

(57) ABSTRACT

An object of the present invention is to provide a technique that can facilitate setting of an object, such as a favorite team. An information output device includes a database that associates and stores a region on a map and a sport team related to the region, a position acquisition unit that acquires a position of a self-vehicle, and a favorite team setting processing unit that sets a favorite team from among sport teams. Moreover, the information output device includes a determination processing unit that specifies the region corresponding to the self-vehicle position acquired by the position acquisition unit and determines the sport team associated with the specified region in the database as an object to be set by the favorite team setting processing unit or a candidate for the object.

6 Claims, 10 Drawing Sheets

(51) Int. Cl.
*G06F 17/30* (2006.01)
*G01C 21/00* (2006.01)

(56) References Cited

U.S. PATENT DOCUMENTS

| | | | | |
|---|---|---|---|---|
| 7,689,556 | B2* | 3/2010 | Garg | G06Q 30/02 707/765 |
| 8,402,487 | B2 | 3/2013 | Icho | |
| 8,403,225 | B2* | 3/2013 | Sharra | G06F 17/30876 235/462.24 |
| 8,655,383 | B2* | 2/2014 | Feng | H04W 4/02 455/424 |
| 2004/0189493 | A1* | 9/2004 | Estus | G08G 1/20 340/988 |
| 2005/0043018 | A1* | 2/2005 | Kawamoto | G06F 17/30749 455/414.3 |
| 2006/0064236 | A1* | 3/2006 | Hayashi | G08G 1/017 701/117 |
| 2006/0173838 | A1* | 8/2006 | Garg | G06Q 30/02 |
| 2008/0045170 | A1 | 2/2008 | Howley et al. | |
| 2008/0116282 | A1* | 5/2008 | Sharra | G06F 17/30876 235/472.01 |
| 2008/0154498 | A1* | 6/2008 | Huang | G01C 21/30 701/431 |
| 2008/0243926 | A1* | 10/2008 | Wako | G06F 17/30017 |
| 2010/0106514 | A1 | 4/2010 | Cox | |
| 2010/0317370 | A1* | 12/2010 | Feng | H04W 4/02 455/456.3 |
| 2011/0231762 | A1* | 9/2011 | Toida | G11B 27/034 715/716 |
| 2011/0238289 | A1* | 9/2011 | Lehmann | G01C 21/3617 701/533 |
| 2013/0212065 | A1* | 8/2013 | Rahnama | G06F 17/30002 707/609 |
| 2014/0046955 | A1* | 2/2014 | Dollard | G06Q 30/0251 707/748 |

FOREIGN PATENT DOCUMENTS

| | | |
|---|---|---|
| JP | 8-210866 A | 8/1996 |
| JP | 11-201763 A | 7/1999 |
| JP | 2010-217112 A | 9/2010 |
| JP | 2011-107068 A | 6/2011 |
| WO | WO 2005/122579 A1 | 12/2005 |
| WO | WO 2005/122579 B1 | 12/2005 |
| WO | WO 2011/052083 A1 | 5/2011 |

* cited by examiner

| GAME NUMBER | TEAM 1 | TEAM 2 | CURRENT INNING | TEAM 1 SCORE | TEAM 2 SCORE | STRIKE COUNT | BALL COUNT | OUT COUNT | ON-BASE STATE |
|---|---|---|---|---|---|---|---|---|---|
| 1 | 31 | 14 | BOTTOM OF SECOND | 2 | 1 | 2 | 2 | 1 | FIRST AND THIRD BASES |
| 2 | 19 | 23 | TOP OF FOURTH | 3 | 0 | 1 | 3 | 0 | 0 |
| ... | ... | ... | ... | ... | ... | ... | ... | ... | ... |

| TEAM NAME | TEAM ID | ADMINISTRATIVE DISTRICT ID OF HOME FIELD |
|---|---|---|
| AAAA TEAM | 23 | 109 |
| BBBB TEAM | 14 | 106 |
| CCCC TEAM | 31 | 216 |
| DDDD TEAM | 19 | 118 |
| ⋮ | ⋮ | ⋮ |

13e

| TEAM NAME | TEAM ID | ADMINISTRATIVE DISTRICT ID OF HOME FIELD |
|---|---|---|
| AAAA TEAM | 23 | 109, 112, 113 |
| BBBB TEAM | 14 | 106 |
| CCCC TEAM | 31 | 216 |
| DDDD TEAM | 19 | 118 |
| ⋮ | ⋮ | ⋮ |

13e

13e

| RECORD NUMBER | TEAM NAME | TEAM ID | ADMINISTRATIVE DISTRICT ID OF HOME FIELD | CITY CENTRAL POINT OF HOME FIELD |
|---|---|---|---|---|
| 1 | AAAA TEAM | 23 | 109 | (35.57, 122.32) |
| 2 | BBBB TEAM | 14 | 106 | (34.06, 118.25) |
| 3 | CCCC TEAM | 31 | 216 | (42.33, 83.06) |
| ⋮ | ⋮ | ⋮ | ⋮ | ⋮ |

| FAVORITE TEAM SELECTION SCREEN ||
|---|---|
| TEAM NAME | DISTANCE FROM SELF-VEHICLE POSITION TO HOME FIELD (km) |
| BBBB TEAM | 24 |
| DDDD TEAM | 165 |
| AAAA TEAM | 197 |
| CCCC TEAM | 230 |

F I G . 1 6

| | ARTIST NAME | ARTIST ID | ADMINISTRATIVE DISTRICT ID OF RELATED REGION |
|---|---|---|---|
| 43b | ARTIST A | 75 | 111 |
| | ARTIST B | 81 | 107 |
| | ARTIST C | 51 | 217 |
| | ARTIST D | 42 | 119 |
| | ⋮ | ⋮ | ⋮ |

F I G . 1 7

| ARTIST NAME | DEGREE OF POPULARITY IN REGION A | DEGREE OF POPULARITY IN REGION B | DEGREE OF POPULARITY IN REGION C |
|---|---|---|---|
| ARTIST A | 516 | 561 | 226 |
| ARTIST B | 569 | 437 | 146 |
| ARTIST C | 627 | 44 | 715 |
| ARTIST D | 536 | 137 | 83 |

F I G . 1 8

(a)

| ARTIST NAME |
|---|
| ARTIST C |
| ARTIST B |
| ARTIST D |
| ARTIST A |

(b)

| ARTIST NAME |
|---|
| ARTIST A |
| ARTIST B |
| ARTIST D |
| ARTIST C |

(c)

| ARTIST NAME |
|---|
| ARTIST C |
| ARTIST A |
| ARTIST B |
| ARTIST D |

INFORMATION OUTPUT DEVICE

TECHNICAL FIELD

The present invention relates to an information output device movable with a moving body, such as a vehicle.

BACKGROUND ART

In recent years, various techniques have been proposed about navigation devices that receive information by performing wireless communication and display the information. For example, Patent Document 1 and Non-Patent Document 1 disclose, when a game result of a certain sport team is received, a technique for displaying a game result of a team that is set in advance by a user as a favorite team differently from a game result of another team.

PRIOR ART DOCUMENT

Patent Document

Patent Document 1: United States Patent Application Publication No. 2010/0106514

Non-Patent Document

Non-Patent Document 1: http://www.siriusxm.com/travel-link

SUMMARY OF INVENTION

Problems to be Solved by the Invention

The above-described favorite team setting is conventionally made by a user manually operating a button of a navigation device. However, as setting for the navigation device, since there are various settings besides the setting for the favorite team, it is troublesome to set the favorite team from the ground up.

Accordingly, the present invention has been made in view of the above problems, and an object of the present invention is to provide a technique that can facilitate setting of an object, such as a favorite team.

Means for Solving the Problems

An information output device according to the present invention is an information output device movable with a moving body. The information output device includes a database that associates a region on a map with an object related to the region and to store the region and the object, a position acquisition unit that acquires a position of the moving body, a setting processing unit that sets a desired object from among the object, and a determination processing unit that specifies the region corresponding to the position acquired by the position acquisition unit and determines the object associated with the specified region in the database as the object to be set by the setting processing unit or a candidate for the object.

Effects of the Invention

The information output device according to the present invention specifies the region corresponding to the position acquired by the position acquisition unit, and determines the object associated with the specified region in the database as the object to be set by the determination processing unit or a candidate for the object. Therefore, it is possible to facilitate setting of a desired object.

BRIEF DESCRIPTION OF DRAWINGS

FIG. 2 is a diagram illustrating game progress information.

FIG. 16 is a diagram illustrating information stored in an artist database according to the fourth embodiment.

FIG. 17 is a diagram illustrating information stored in an artist database according to a fifth embodiment.

FIG. 18 is a diagram illustrating display of the information output device according to the fifth embodiment.

DESCRIPTION OF EMBODIMENTS

First Embodiment

Figure 1:
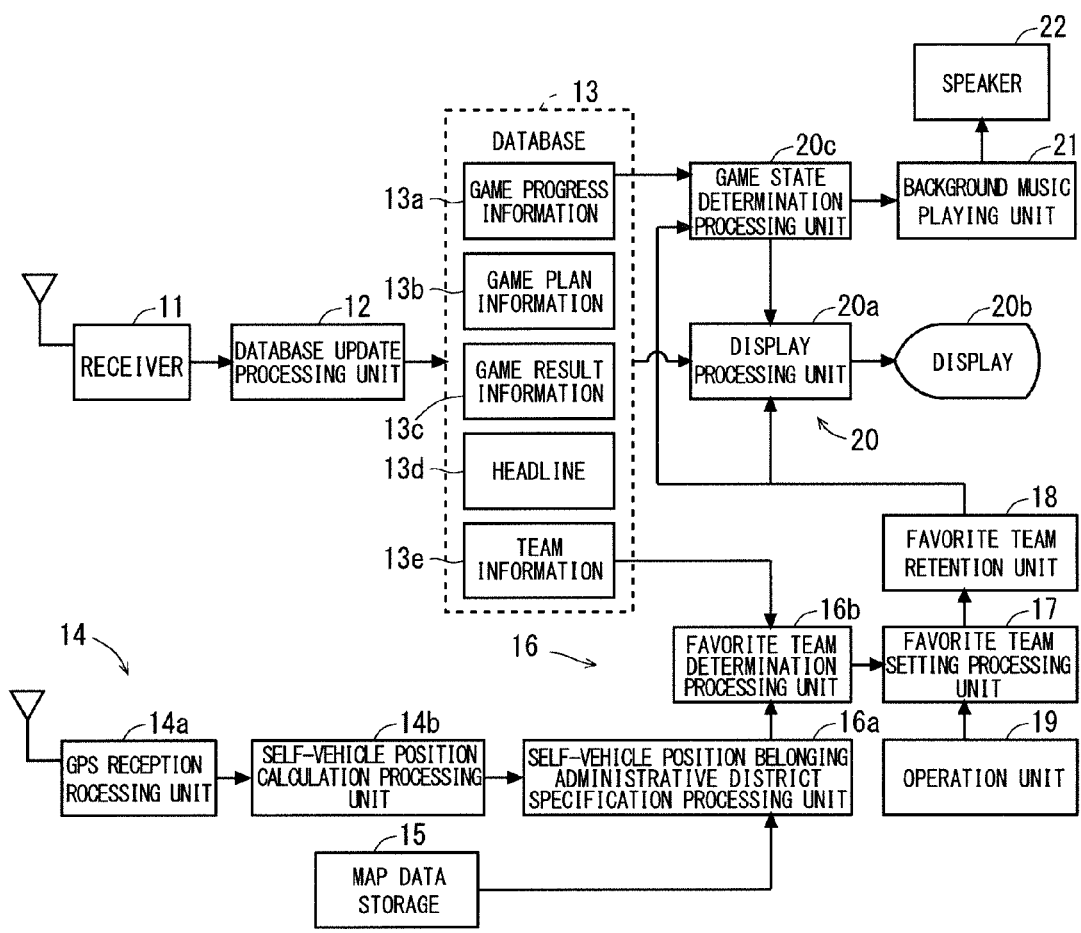
FIG. 1 is a block diagram illustrating a configuration of an information output device according to a first embodiment.

FIG. 1 is a block diagram illustrating a configuration of an information output device according to a first embodiment of the present invention. This information output device is a device movable with a moving body, and includes not only a car navigation device and portable navigation device (PND) movable with a vehicle, but also a mobile terminal, etc. movable with a person. The following description uses a vehicle as an example of the moving body, and a vehicle equipped with the information output device is referred to as a self-vehicle.

The information output device illustrated in FIG. 1 includes a receiver 11, a database update processing unit 12, a database 13, a position acquisition unit 14, a map data storage 15 for storing data of a map, a determination processing unit 16, a favorite team setting processing unit 17, a favorite team retention unit 18, an operation unit 19, an information display 20, a background music playing unit 21, and a speaker 22.

This information output device makes it possible to set a favorite team which a user likes from among sport teams by the favorite team setting processing unit 17. When the favorite team is set by the favorite team setting processing unit 17, the information output device can display the favorite team differently from another team (for example, conspicuously or clearly), etc. Next, each component of the information output device will be described.

The receiver 11 receives a wireless signal including various kinds of information (for example, sport score information) such as a game result of a sport team, and applies processing such as demodulation to the wireless signal, thereby acquiring digital-format information. The database update processing unit 12 uses the information acquired by the receiver 11 to update information stored in the database 13. Herein, such receiver 11 and database update processing unit 12 are described, for example, in Patent Document 1.

The database 13 stores game progress information 13a, game plan information 13b, game result information 13c, a headline 13d, and team information 13e.

The game progress information 13a is information regarding the game obtained during the game, as in an example illustrated in FIG. 2. As illustrated in FIG. 2, when the sport team is a baseball team, the game progress information 13a includes a game number for identifying the game, a team number for identifying the baseball team (team number 1, team number 2), a current inning, a score of the baseball team (score of team number 1, score of team number 2), a strike count, a ball count, an out count, and information about an on-base state.

Returning to FIG. 1, the game plan information 13b stored in the database 13 is information regarding the game obtained before the game starts, such as a player who plans to participate in the game. The game result information 13c is information regarding the game obtained after the game ends, such as a score of the sport team after the game ends. The headline 13d is subtitle information regarding the game such as a telop.

Figures 3, 4:
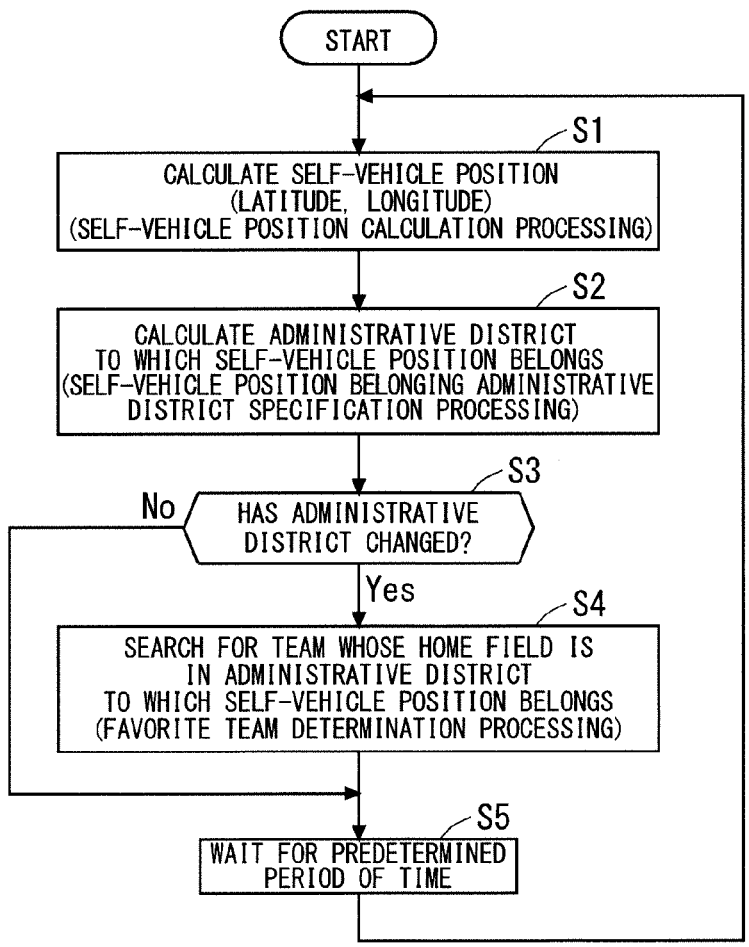
FIG. 3 is a diagram illustrating team information according to the first embodiment.
FIG. 4 is a flow chart illustrating operation of the information output device according to the first embodiment.

The team information 13e is information that associates an administrative district (region), such as a country, prefecture, city, town, and village on a map, with a sport team (object) related to the administrative district, like an example illustrated in FIG. 3. In the example illustrated in FIG. 3, the team information 13e associates a name of a sport team and a team ID individually assigned to the sport team with an administrative district ID to which a home field of the sport team corresponds (administrative district ID of the home field) from among administrative district IDs that include numbers individually assigned to the administrative districts.

Returning to FIG. 1, the position acquisition unit 14 includes a GPS reception processing unit 14a and a self-vehicle position calculation processing unit 14b. The GPS reception processing unit 14a receives a wireless signal from a GPS satellite. Then, the self-vehicle position calculation processing unit 14b calculates a position of the information output device on an absolute coordinate (latitude, longitude) based on the wireless signal received by the GPS reception processing unit 14a.

The self-vehicle position is calculated by the above-described position acquisition unit 14 that includes the GPS reception processing unit 14a and the self-vehicle position calculation processing unit 14b.

An administrative district ID similar to the administrative district ID associated in the team information 13e is defined in the map data stored in the map data storage 15. The administrative district ID defined in the map data and the administrative district ID in the team information 13e use an identical ID system. Accordingly, it will be appreciated that, when an administrative district ID defined in the map data is identical to an administrative district ID in the team information 13e, both IDs represent an identical administrative district.

The determination processing unit 16 includes a self-vehicle position belonging administrative district specification processing unit 16a and a favorite team determination processing unit 16b.

When the position (coordinate data) acquired by the position acquisition unit 14 is inputted, the self-vehicle position belonging administrative district specification processing unit 16a specifies an administrative district ID to which the position (coordinate data) belongs from the map data. The self-vehicle position belonging administrative district specification processing unit 16a having such a function is described in, for example, Japanese Patent Application Laid-Open No. 8-105751 (1996-105751) and Japanese Patent Application Laid-Open No. 11-201763 (1999-201763).

The favorite team determination processing unit 16b searches the team information 13e stored in the database 13 for the administrative district ID (administrative district ID to which the self-vehicle position belongs) specified by the self-vehicle position belonging administrative district specification processing unit 16a. Then, the favorite team determination processing unit 16b determines the sport team associated with the administrative district ID in the team information 13e as a sport team to be set by the favorite team setting processing unit 17.

For example, in a case where the team information 13e illustrated in FIG. 3 is stored in the database 13, when an administrative district ID specified by the self-vehicle position belonging administrative district specification processing unit 16a is "106", the favorite team determination processing unit 16b determines "BBBB team" as a sport team to be set by the favorite team setting processing unit 17.

The above-described determination processing unit 16 that includes the self-vehicle position belonging administrative district specification processing unit 16a and the favorite team determination processing unit 16b specifies an administrative district (administrative district ID) corresponding to the self-vehicle position acquired by the position acquisition unit 14, and determines a sport team associated with the specified administrative district in the database 13 as a sport team to be set by the favorite team setting processing unit 17.

FIG. 4 is a flow chart illustrating operation from acquisition of a position by the position acquisition unit 14 to determination by the determination processing unit 16. This operation will be described below with reference to FIG. 4.

In step S1, the position acquisition unit 14 calculates a self-vehicle position (latitude, longitude) (performs self-vehicle position calculation processing). In step S2, the self-vehicle position belonging administrative district specification processing unit 16a of the determination processing unit 16 calculates an administrative district to which the self-vehicle position calculated in step S1 belongs (performs self-vehicle position belonging administrative district determination processing).

In step S3, the determination processing unit 16 determines whether the administrative district ID calculated in the present step S2 has changed from the administrative district ID determined in the previous step S2. When determined that the administrative district ID has changed, the operation proceeds to step S4. When determined that the administrative district ID has not changed, the operation proceeds to step S5.

In step S4, the favorite team determination processing unit 16b of the determination processing unit 16 searches for a sport team associated with the administrative district ID calculated in the present step S2, that is, a sport team whose home field is the administrative district to which the self-vehicle position belongs (performs favorite team determination processing). After waiting for a predetermined period of time (for example, five minutes) in step S5, the operation returns to step S1.

By performing the above operation of steps S1 to S5 regularly and repeatedly, a sport team to be set by the favorite team setting processing unit 17 is regularly (for example, every five minutes) determined. Herein, the favorite team determination processing unit 16b regularly determines the sport team every five minutes, but the determination is not limited to this method. The determination may be made every time the information output device moves a certain distance (for example, 5 km). When the information output device is mounted in a vehicle, the determination may be made every time an engine of the vehicle starts up.

Returning to FIG. 1, the favorite team setting processing unit 17 sets the sport team (team ID) determined by the determination processing unit 16 from among sport teams (objects) as a favorite team (desired object). This allows a favorite team to be automatically set even if a user does not manually set the favorite team.

However, the automatically set sport team may actually differ from the favorite team. Accordingly, when a favorite team of a user is known, that is, when the operation unit 19 receives, from the user, setting operation of a sport team to be set as a favorite team, the favorite team setting processing unit 17 sets the sport team received by the operation unit 19 as a favorite team regardless of the sport team determined by the determination processing unit 16.

The favorite team retention unit 18 retains the favorite team (team ID) set by the favorite team setting processing unit 17 so that, even after the information output device is turned off, the favorite team that is set before turning off the device can be used.

The information display 20 includes a display processing unit 20a, a display 20b, and a game state determination processing unit 20c.

The display processing unit 20a controls the display 20b so that the display 20b displays the information (information retained in the database 13) received by the receiver 11. In this way, the information display 20 that includes the display processing unit 20a and the display 20b displays the information received by the receiver 11. The information to be displayed in the information display 20 will be described in detail later.

When the game progress information 13a is received by the receiver 11 and stored in the database 13, the game state determination processing unit 20c determines whether game progress indicated by the game progress information 13a is favorable to the favorite team set by the favorite team setting processing unit 17.

Herein, the game state determination processing unit 20c compares scores in progress of the game of a favorite team and an opponent team indicated by the game progress information 13a every time the game progress information 13a is updated. Then, the game state determination processing unit 20c determines that the game progress is preferable when the score of the favorite team is higher than the score of the opponent team. The game state determination processing unit 20c determines that the game progress is not preferable when the score of the favorite team is lower than the score of the opponent team. The game state determination processing unit 20c outputs a determination result about whether the game progress is preferable to the display processing unit 20a and the background music playing unit 21.

The display processing unit 20a acquires an icon pattern, etc. associated in advance with the determination result from the game state determination processing unit 20c from among a display color, icon pattern, and animation prepared in advance. The display processing unit 20a controls the display 20b so that the acquired icon pattern and the like are displayed in the display 20b.

Since the information display 20 includes the above-described display processing unit 20a, the display 20b, and the game state determination processing unit 20c, when the receiver 11 receives the game progress information 13a of the favorite team set by the favorite team setting processing unit 17, a display mode of the information can be changed depending on the game progress (herein, a score during the game).

Figure 5:
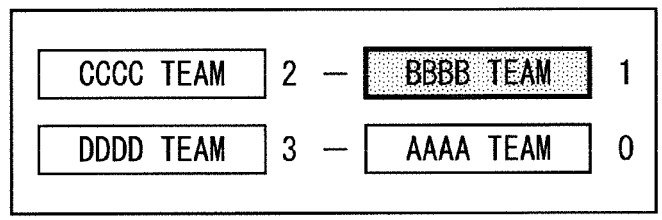
FIG. 5 is a diagram illustrating display of the information output device according to the first embodiment.

FIG. 5 is a diagram illustrating an example of display of the information display 20 in progress of the game of the favorite team. Herein, it is assumed that "BBBB team" has been set by the favorite team setting processing unit 17 as a favorite team.

As illustrated in FIG. 5, when the receiver 11 receives the game progress information 13a of the favorite team, information on the favorite team is displayed differently from information on other teams. Then, in the display mode in which information is differently displayed, in progress of the game of the favorite team, a background of the score (game progress information 13a) is displayed in a brighter display color when the score of the favorite team is higher than the score of the opponent team. When the score of the favorite team is lower than the score of the opponent team, the background of the score is displayed in a darker display color.

The background music playing unit 21 acquires background music associated in advance with a determination result from the game state determination processing unit 20c from among background music prepared in advance in a same manner as the display processing unit 20a, and controls the speaker 22 so that the acquired background music is outputted by the speaker 22.

In this way, when the receiver 11 receives the game progress information 13a of the favorite team set by the favorite team setting processing unit 17, an output of the display 20b and the speaker 22, that is, an output of a human machine interface (HMI) varies depending on the game progress.

A configuration in which the output of the game progress information 13a in the HMI is varied depending on content of the game progress information 13a has been described above. Added to this, the information output device according to the present first embodiment is configured to vary an output of the game plan information 13b, the game result information 13c, the headline 13d, and the team information 13e in the HMI depending on content of these pieces of information.

The information output device configured in this way makes it possible, for example, to vary the output of the game result information 13c in the HMI depending on a victory-or-defeat result of the favorite team. In addition, this information output device makes it possible to vary the output of the game plan information 13b and the game result information 13c in the HMI depending on ranking of the favorite team, for example, in a brighter display color when the ranking of the favorite team is higher, and in a darker display color when the ranking of the favorite team is lower.

The above-described information output device according to the first embodiment specifies an administrative district corresponding to a position acquired by the position acquisition unit 14. The information output device determines a sport team associated with the specified administrative district in the database 13 as a sport team to be set by the favorite team setting processing unit 17. Accordingly, since it is possible to automatically set a favorite team even if a user does not set a favorite team manually, it is possible to facilitate setting of a favorite team. In addition, when a self-vehicle is located in a home field, etc. of a certain sport team, a user is likely to live around the home field, and the sport team is likely to be a favorite team of the user. Accordingly, the information output device according to the present first embodiment makes it possible to automatically set a sport team that is likely to coincide with the favorite team of the user as a favorite team.

In addition, for example, since it is possible to set a sport team whose home field is in each region one after another as a favorite team as the self-vehicle moves, the information output device is expected to enhance enjoyment.

In addition, when the receiver 11 receives the game progress information 13a of the favorite team set by the favorite team setting processing unit 17, the information output device according to the present first embodiment changes the display mode of the information depending on the game progress. Accordingly, the user can intuitively know the displayed game progress of the sport team.

The above description has been made on an assumption that the game progress information 13a, the game plan information 13b, the game result information 13c, the headline 13d, and the team information 13e are updated by the database update processing unit 12 based on information contained in a wireless signal from outside. However, while the game progress information 13a, the game plan information 13b, the game result information 13c, and the headline 13d are updated relatively frequently, an update frequency of the team information 13e is relatively low because the team information 13e is changed only at a time of team name change, new registration or elimination of a team, or change of a home field. Accordingly, for the team information 13e, the database update processing unit 12 may use an updating method different from an updating method for the game progress information 13a, the game plan information 13b, the game result information 13c, and the headline 13d (for example, a method of loading data from a storage medium such as a removable CD-ROM, or a method of loading data from a server in a facility outside a vehicle such as a service center via wireless communication).

In the above description, the game state determination processing unit 20c determines whether the game progress is preferable depending on a score in progress of a game indicated in the game progress information 13a. However, the game state determination processing unit 20c is not limited to this, and may determine whether the game progress is preferable depending on a factor other than the score of the game progress information 13a.

Figure 6:
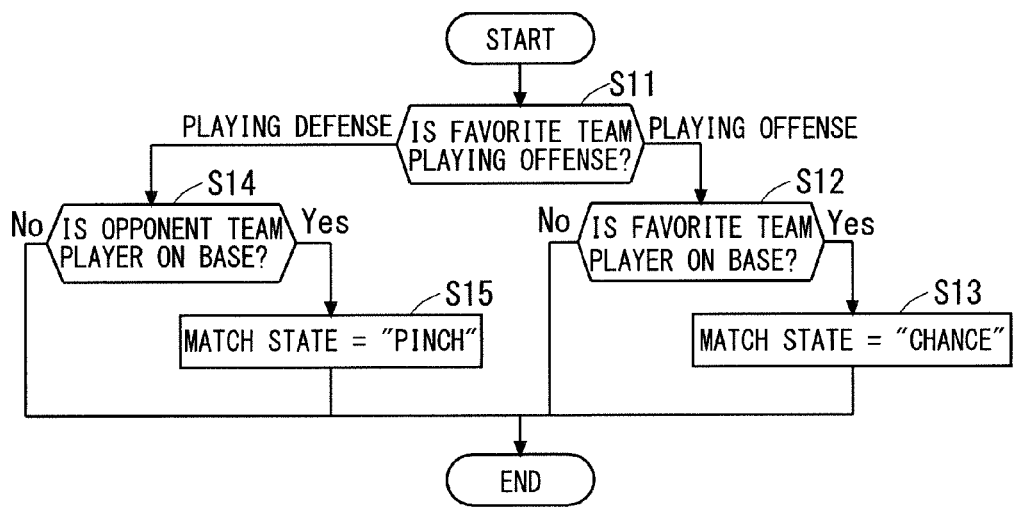
FIG. 6 is a flow chart illustrating operation of the information output device according to the first embodiment.

FIG. 6 is a flow chart illustrating operation of the game state determination processing unit 20c determining whether baseball game progress is preferable depending on a factor other than a score.

First, in step S11, the game state determination processing unit 20c determines whether a favorite team is playing offense based on the game progress information 13a. When the favorite team is playing offense, the operation proceeds to step S12, and when the favorite team is playing defense, the operation proceeds to step S14.

In step S12, the game state determination processing unit 20c determines whether a player of the favorite team is on base based on the game progress information 13a. When a player is on base, the operation proceeds to step S13, and when a player is not on base, the game state determination processing unit 20c ends the operation illustrated in FIG. 6. In step S13, after determining that the game progress is preferable (match state="chance"), the game state determination processing unit 20c ends the operation illustrated in FIG. 6.

In step S14, the game state determination processing unit 20c determines whether a player of an opponent team is on base based on the game progress information 13a. When a player is on base, the operation proceeds to step S15, and when a player is not on base, the game state determination processing unit 20c ends the operation illustrated in FIG. 6. In step S15, after determining that the game progress is not preferable (match state="pinch"), the game state determination processing unit 20c ends the operation illustrated in FIG. 6. The above-described operation illustrated in FIG. 6 allows the game state determination processing unit 20c to determine whether the game progress is preferable depending on the factor other than the score in the game progress information 13a.

The above description has been made assuming that the administrative district ID is a number. However, the administrative district ID is not limited to this example, and may be information other than a number when the administrative district ID is defined according to an identical rule in both map data and the team information 13e as data for identifying a region.

In addition, the information output device may be configured to notify a user via the HMI when a game of a favorite team starts, or when a favorite team scores.

<First Variation>

An information output device according to a first variation of the first embodiment shall be a device movable with a vehicle such as a car navigation device and a PND.

The information output device of the first embodiment automatically sets a favorite team based on a "self-vehicle position" acquired by the position acquisition unit 14. In contrast, the information output device according to the present first variation automatically sets a favorite team by using a "position of a garage for a vehicle (hereinafter "garage position")" instead of the "self-vehicle position".

Figure 7:
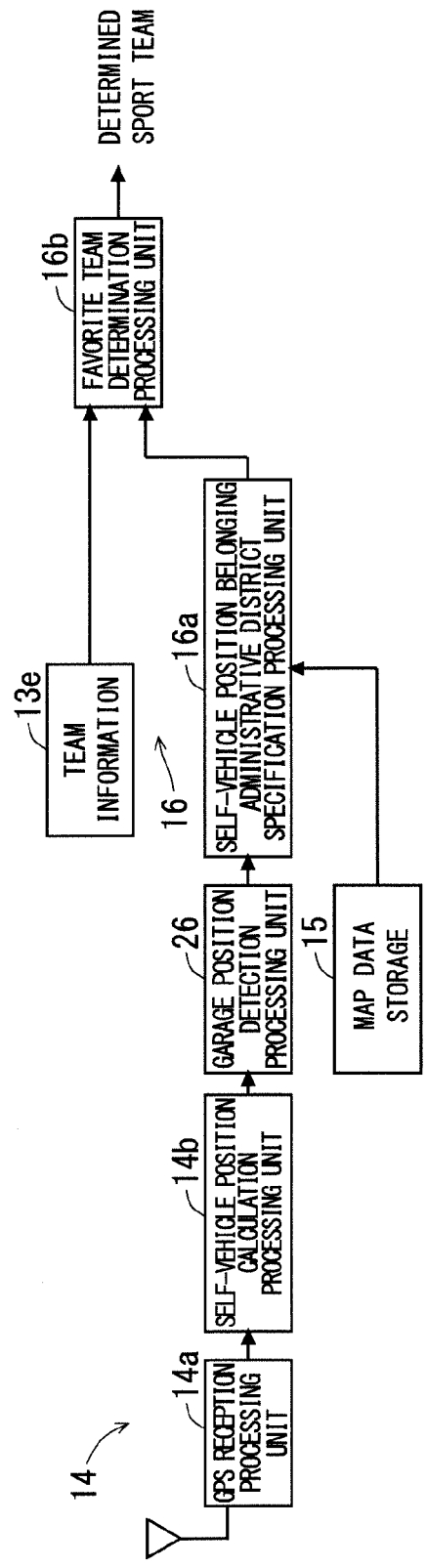
FIG. 7 is a block diagram illustrating part of a configuration of the information output device according to a first variation of the first embodiment.

FIG. 7 is a block diagram illustrating part of a configuration of the information output device according to the present first variation. This information output device has a configuration with a garage position detection processing unit 26 being added to the configuration of the information output device illustrated in FIG. 1.

The garage position detection processing unit 26 detects a garage position based on a position calculated by the self-vehicle position calculation processing unit 14b. Herein, the garage position detection processing unit 26 detects a position with a longest parking time from among a history of a position calculated by the self-vehicle position calculation processing unit 14*b* as a garage position. Herein, the garage position detection processing unit 26 that detects a garage position, etc. by learning or estimation in this way is described in, for example, Japanese Patent Application Laid-Open No. 8-210866 (1996-210866). The garage position detection processing unit 26 outputs the detected garage position to the self-vehicle position belonging administrative district specification processing unit 16*a* of the determination processing unit 16.

The self-vehicle position belonging administrative district specification processing unit 16*a* uses the garage position detected by the garage position detection processing unit 26 instead of a position acquired by the position acquisition unit 14. Other components are identical to components of the information output device of the first embodiment.

The above-described information output device according to the present first variation uses the position of the garage of a vehicle instead of the position acquired by the position acquisition unit 14. Accordingly, since setting of a favorite team is automatically performed in a same manner as the information output device described in the first embodiment, it is possible to facilitate setting of a favorite team.

Herein, when a "self-vehicle position" is compared with a "garage position", since the "garage position" seldom changes over time, and since a user typically lives near the garage position in many cases, it is possible to accurately specify a residence place of the user (belonging place). In addition, generally speaking, since a user is likely to select a sport team whose home field is the residence place and periphery of the residence place as a favorite team, it is expected that a possibility of a sport team that is automatically set coinciding with a favorite team of the user increases.

Herein, in the above description, the self-vehicle position belonging administrative district specification processing unit 16*a* of the determination processing unit 16 uses a garage position detected by learning by the garage position detection processing unit 26. However, the self-vehicle position belonging administrative district specification processing unit 16*a* of the determination processing unit 16 is not limited to this, and may use a garage position that is set by the user himself or herself.

<Second Variation>

An information output device according to a second variation of the first embodiment shall be a device movable with a vehicle in a same manner as in the first variation.

The information output device of the first embodiment automatically sets a favorite team based on a "self-vehicle position" or a "garage position". In contrast, the information output device according to the present second variation uses, instead of the "self-vehicle position" and the "garage position", a position indicated by address data acquired from a vehicle or by address data acquired from a mobile terminal brought inside the vehicle to automatically set a favorite team. The following description assumes that the address data is address data of a user of the information output device.

Figure 8:
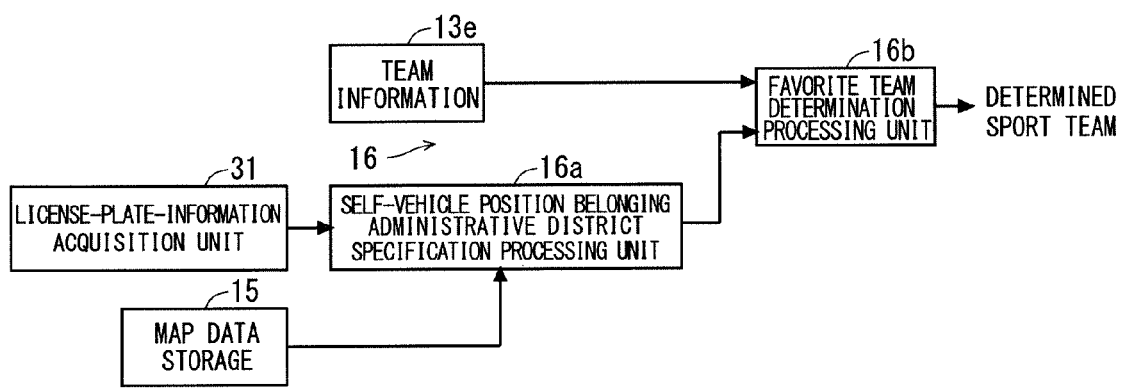
FIG. 8 is a block diagram illustrating part of a configuration of the information output device according to a second variation of the first embodiment.

FIG. 8 is a block diagram illustrating part of a configuration of the information output device according to the present second variation. In this information output device, a license-plate-information acquisition unit 31 (address acquisition unit) is provided instead of the position acquisition unit 14 (GPS reception processing unit 14*a* and self-vehicle position calculation processing unit 14*b*) of the information output device illustrated in FIG. 1.

In addition, a license plate in which an electronic chip that stores information including address data is embedded, a so-called smart plate is installed in a vehicle. The license-plate-information acquisition unit 31 acquires address data from the electronic chip of the smart plate, and outputs a position indicated by the address data to the self-vehicle position belonging administrative district specification processing unit 16*a* of the determination processing unit 16.

The self-vehicle position belonging administrative district specification processing unit 16*a* uses the position indicated by the address data acquired from the vehicle instead of a position acquired by the position acquisition unit 14. Other components are identical to components of the information output device of the first embodiment.

The above-described information output device according to the present second variation uses the position indicated by the address data acquired from the vehicle instead of the position acquired by the position acquisition unit 14. Accordingly, since setting of a favorite team is automatically performed in a same manner as the information output device described in the first embodiment, it is possible to facilitate setting of a favorite team. In addition, it is expected that a possibility of a sport team that is automatically set coinciding with a favorite team of the user increases from a reason similar to a reason in the first variation. In addition, since it is not necessary to use the GPS reception processing unit 14*a* and the self-vehicle position calculation processing unit 14*b*, simplification of the configuration of the information output device can also be expected.

Herein, a case where the information output device uses the address data acquired by the license-plate-information acquisition unit 31 from the smart plate has been described. However, the second variation is not limited to using the address data acquired from the smart plate. When address data is stored in a device provided in a vehicle, the address data may be used.

Figure 9:
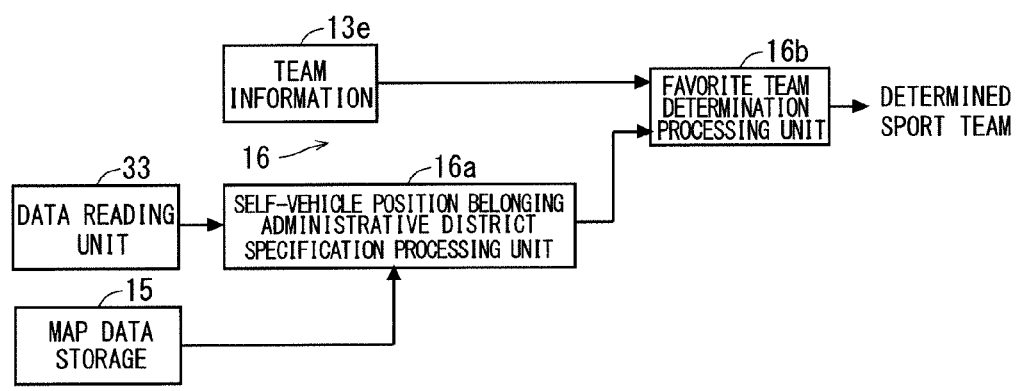
FIG. 9 is a block diagram illustrating part of the configuration of the information output device according to the second variation of the first embodiment.

FIG. 9 is a block diagram illustrating part of another configuration of the information output device according to the present second variation. This information output device is provided with a data reading unit 33 instead of the position acquisition unit 14 (GPS reception processing unit 14*a* and self-vehicle position calculation processing unit 14*b*) of the information output device illustrated in FIG. 1.

Herein, it is assumed that a user of the information output device is in a vehicle carrying a mobile terminal, such as an apparatus or a mobile phone, that stores information regarding identification of the user, such as address data. The data reading unit 33 performs wireless communication with the mobile terminal carried inside the vehicle, and acquires address data of the user from the mobile terminal. Then, the data reading unit 33 outputs a position indicated by the acquired address data to the self-vehicle position belonging administrative district specification processing unit 16*a* of the determination processing unit 16.

The self-vehicle position belonging administrative district specification processing unit 16*a* uses the position indicated by the address data acquired from the mobile terminal instead of the position acquired by the position acquisition unit 14. Other components are identical to components of the information output device of the first embodiment.

The above-described information output device according to the present second variation uses the position indicated by the address data acquired from the mobile terminal instead of the position acquired by the position acquisition unit 14. Accordingly, since setting of a favorite team is automatically performed in a same manner as the information output device described in the first embodiment, it is possible to facilitate setting of a favorite team. In addition, it is expected that a possibility of a sport team that is automatically set coinciding with a favorite team of the user increases from a reason similar to a reason in the first variation. In addition, since it is not necessary to use the GPS reception processing unit 14a and the self-vehicle position calculation processing unit 14b, simplification of the configuration of the information output device can also be expected.

<Third Variation>

Figures 10, 11:
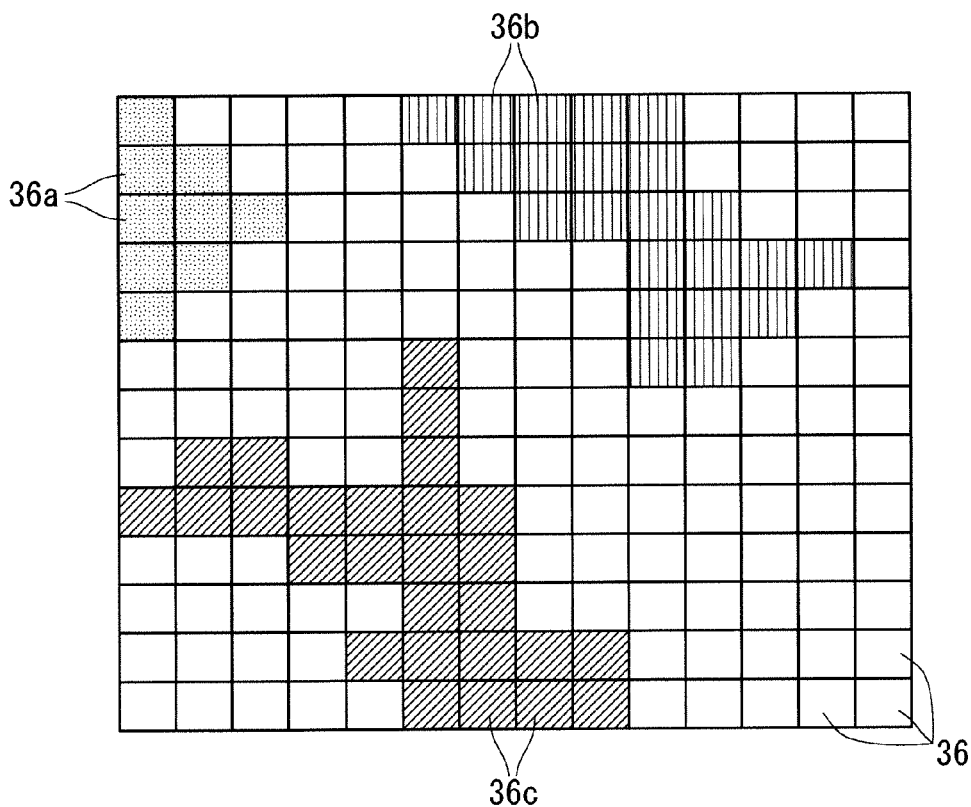
FIG. 10 is a diagram illustrating team information according to a third variation of the first embodiment.
FIG. 11 is a diagram illustrating a mesh according to the third variation of the first embodiment.

FIG. 10 is a diagram illustrating an example of the team information 13e stored in the database 13 according to a third variation of the first embodiment. In the team information 13e illustrated in FIG. 3, one administrative district (region) corresponding to a home field is associated with one sport team (object related to the region).

In contrast, in the information output device according to the present third variation, as illustrated in FIG. 10, one or more administrative districts (regions) are associated with one sport team (object related to the regions).

In the team information 13e illustrated in FIG. 10, in a same manner as above, an administrative district ID (herein "109") for identifying a home field (herein B city) of an AAAA team is associated with an "AAAA team" and a team ID "23". In addition, in this team information 13e, an administrative district ID (herein "112" and "113") that identifies a region (herein C city and D city) with a high percentage of population that favors the AAAA team is associated with the "AAAA team" and the team ID "23". Except for this, the team information 13e is similar to that in FIG. 3.

The information output device according to the present third variation makes it possible to automatically set the "AAAA team" as a favorite team when, for example, a self-vehicle position is located in one of B city, C city, and D city.

Herein, in the above description, an administrative district is associated with one sport team (object related to the region). However, what is associated with one sport team is not limited to an administrative district, but may be, for example, a mesh 36 illustrated in FIG. 11, the mesh 36 being used in a typical car navigation device, etc.

FIG. 11 illustrates meshes 36a, 36b, and 36c to which three types of hatching are applied. For example, in each of the mesh 36a, when a percentage of population that favors the "AAAA team" is high, a mesh ID unique to each of the mesh 36a will be associated with the "AAAA team". The information output device according to the present third variation makes it possible to automatically set the "AAAA team" as a favorite team when, for example, the self-vehicle position is located in an arbitrary mesh 36a.

Second Embodiment

In the first embodiment, as illustrated in FIG. 3, an administrative district on a map is associated with one sport team. In contrast, in a second embodiment of the present invention, a point on a map is associated with one sport team (object related to the point). Hereinafter, in the information output device according to the present second embodiment, components identical or similar to components described in the first embodiment are provided with identical symbols, and description will focus on a different point.

Figures 12, 13:
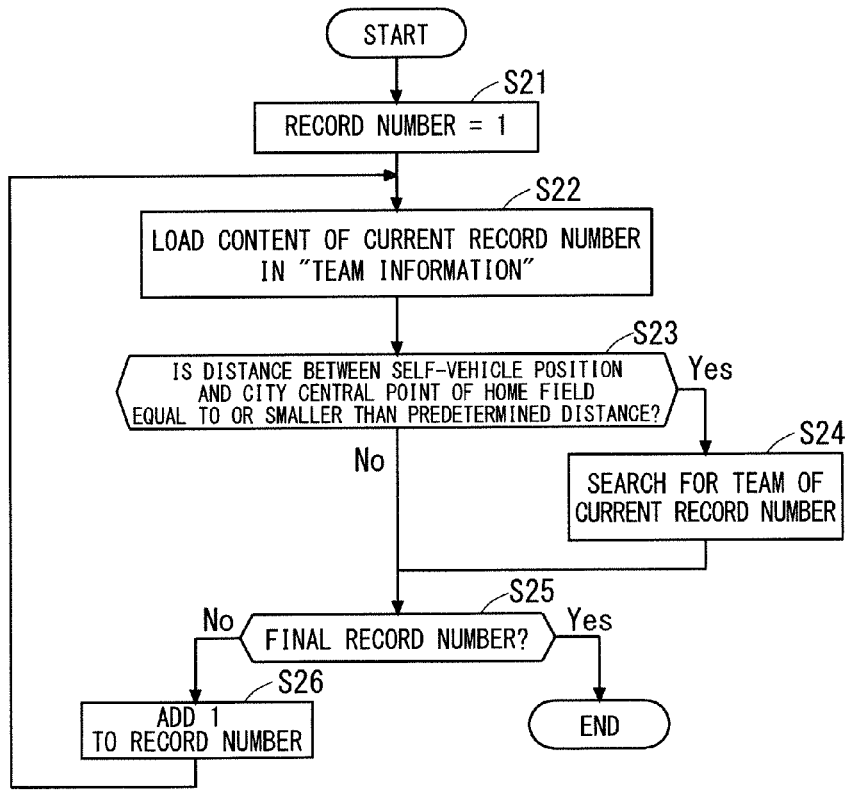
FIG. 12 is a diagram illustrating team information according to a second embodiment.
FIG. 13 is a flow chart illustrating operation of the information output device according to the second embodiment.

FIG. 12 is a diagram illustrating an example of the team information 13e stored in the database 13 according to the present second embodiment. In the team information 13e illustrated in FIG. 12, a point (longitude, latitude) on a map is associated with a sport team (object) related to the point.

Herein, in each city, a coordinate (herein a coordinate expressed in a decimal system) at latitude and longitude equivalent to a point which is the busiest town, or to a point representing the city is defined as a city central point (city center or central business district). In addition, in the team information 13e according to the present second embodiment, a city central point of a home field of a sport team or a city central point closest thereto (hereinafter both are referred to as "city central point of the home field") is associated with the sport team.

When information from a broadcasting station side acquired by the receiver 11 contains a specific city central point corresponding to a specific sport team, the city central point may be applied as the city central point of this team information 13e. Alternatively, when the city central point is associated in advance with an administrative district (administrative district ID) in map data, the city central point corresponding to an administrative district ID of the home field may be applied as the city central point of this team information 13e.

FIG. 13 is a flow chart illustrating operation of the determination processing unit 16 according to the present second embodiment. This determination processing unit 16 specifies a city central point (point) based on a distance between a city central point (point) and a position acquired by the position acquisition unit 14. The determination processing unit 16 determines a sport team (object related to the point) associated with the specified city central point in the database 13 as a sport team to be set by the favorite team setting processing unit 17 or a candidate for the sport team. Operation of the determination processing unit 16 will be described below with reference to FIG. 13.

First, in step S21, the determination processing unit 16 initializes a record number to be loaded from the team information 13e to "1".

In step S22, the determination processing unit 16 loads content of a current record number from the team information 13e. For example, because the record number is "1" if the operation has proceeded from step S21 to the present step S22, the determination processing unit 16 loads a team name, city central point of a home field, and the like of the record number of "1" (such as "AAAA team" and "(37.57, 122.32)" in the example illustrated in FIG. 12).

In step S23, the determination processing unit 16 determines whether a distance between the self-vehicle position acquired by the position acquisition unit 14 and the city central point of the home field loaded in step S22 is equal to or smaller than a predetermined distance (for example, 30 km). The distance herein may be a distance in a straight line between two points, and may be a shortest distance between two points on a road obtained by using a path searching function when the information output device has the path searching function.

When it is determined that the distance between the self-vehicle position and the city central point of the home field is equal to or smaller than the predetermined distance, the operation proceeds to step S24. When it is determined that the distance between the self-vehicle position and the city central point of the home field is larger than the predetermined distance, the operation proceeds to step S25.

In step S24, the determination processing unit 16 determines a sport team corresponding to the city central point (specified city central point) of the home field with the distance being determined to be equal to or smaller than the predetermined distance as a sport team to be set by the favorite team setting processing unit 17 or a candidate for the sport team. That is, the determination processing unit 16 determines a sport team corresponding to the current record number as a sport team to be set by the favorite team setting processing unit 17 or a candidate for the sport team. Subsequently, the operation proceeds to step S25.

In step S25, the determination processing unit 16 determines whether the current record number is a final record number. When the determination processing unit 16 determines that the current record number is not a final record number, in step S26, "1" is added to the current record number, and the operation of step S22 is applied to a record number next to the current record number. On the other hand, when determining that the current record number is the final record number, the determination processing unit 16 ends the operation illustrated in FIG. 13.

The favorite team setting processing unit 17 sets a favorite team (desired object) from among sport teams (objects).

Specifically, upon the operation of the determination processing unit 16 ending, when the sport team determined in step S24 is one, the favorite team setting processing unit 17 sets the sport team as a favorite team.

On the other hand, upon the operation of the determination processing unit 16 ending, when a plurality of sport teams determined in step S24 exist, the plurality of sport teams determined in step S24 are displayed in the display 20b. Then, when the operation unit 19 receives, from a user, setting operation for setting a sport team to a favorite team from among the plurality of sport teams displayed in the display 20b, the favorite team setting processing unit 17 sets the sport team received by the operation unit 19 as a favorite team. Herein, a third embodiment will describe in detail the above-described operation in a case where the plurality of sport teams determined in step S24 exist upon the operation of the determination processing unit 16 ending.

The above-described information output device according to the present second embodiment specifies a city central point based on a distance between the city central point and a position acquired by the position acquisition unit 14. The information output device then determines a sport team associated with the city central point in the database 13 as a sport team to be set by the favorite team setting processing unit 17 or a candidate for the sport team. Accordingly, since it is possible to automatically set a sport team that is likely to coincide with the favorite team as a favorite team, or to select the sport team as a favorite team, it is possible to facilitate setting of a favorite team.

Herein, in the team information 13e, a point associated with a sport team is not limited to the above-described city central point in the home field area as long as the point is a point representing the home field of the sport team. A point of a stadium that is a home ground of the sport team may be used. Alternatively, as a point to be associated with a sport team, when the sport team has a sponsor company, a point at which a head office or a factory of the company is located may be used instead. That is, instead of the above-described city central point in the home field area, an arbitrary point with a higher percentage of population that favors the sport team or a point in a vicinity of the arbitrary point may be used.

In addition, in a same way as in the first embodiment, when the receiver 11 receives information that indicates game progress of the sport team set by the favorite team setting processing unit 17, the information display 20 may change a display mode of the information depending on the game progress. Such a configuration allows a user to intuitively know the displayed game progress of the sport team.

Third Embodiment

In a third embodiment of the present invention, when a plurality of sport teams determined in step S24 of the second embodiment exist, a favorite team is set by operation of a user. Herein, in the information output device according to the present third embodiment, components identical or similar to components described in the second embodiment are provided with identical symbols, and description will focus on a different point.

In steps S23 and S24 illustrated in above-described FIG. 13, the determination processing unit 16 according to the present third embodiment establishes ranking of a sport team determined as a candidate for a sport team that is set by the favorite team setting processing unit 17 in ascending order of distance between a city central point and a position acquired by the position acquisition unit 14. The distance herein is, but not limited to, a distance in a straight line between two points, and may be a shortest distance between two points on a road obtained by using a path searching function when the information output device has the path searching function.

Figures 14, 15:
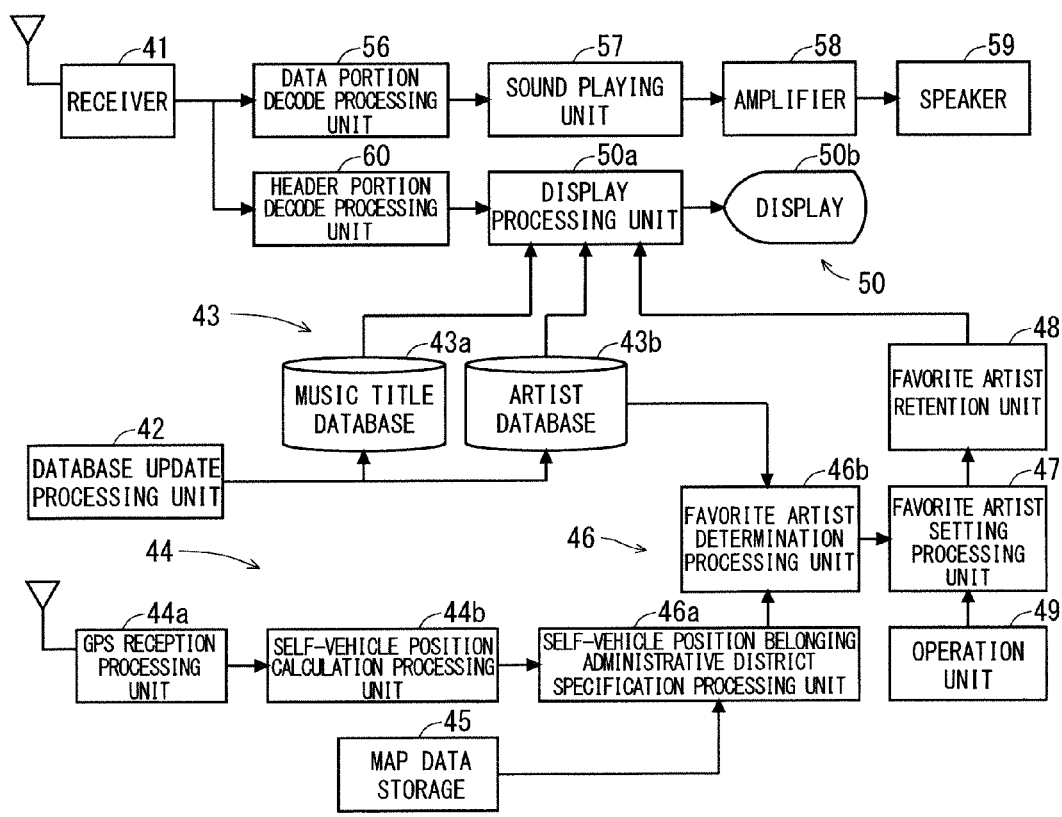
FIG. 14 is a diagram illustrating display of the information output device according to a third embodiment.
FIG. 15 is a block diagram illustrating a configuration of the information output device according to a fourth embodiment.

As illustrated in FIG. 14, the information display 20 displays the sport team in a line according to the ranking established by the determination processing unit 16. That is, the information display 20 displays a screen (favorite team selection screen) of a list in which in order of distance from top to bottom, a candidate for the sport team and distance are arranged. Herein, the information display 20 displays all candidates for the sport team.

The favorite team setting processing unit 17 sets, as a favorite team, a sport team selected by operation (for example, pushing down of a team name on a screen) from a user in the operation unit 19 from among sport teams displayed in the information display 20.

The above-described information output device according to the present third embodiment displays a candidate for a sport team in a line in order of distance. Accordingly, since a sport team is displayed in ascending order of distance from a self-vehicle position to a city central point, the user can easily know a sport team that is likely to coincide with a favorite team. In addition, the user can intuitively know a positional relationship of a home field of the sport team.

In addition, the information output device according to the present third embodiment sets a sport team selected by operation of a user, etc. from among the sport teams displayed in the information display 20 as described above as a favorite team. Accordingly, since the user can set a favorite team from among sport teams that are likely to coincide with a favorite team, it is possible to facilitate setting of a favorite team.

Herein, in the above first to third embodiments, a baseball team is mentioned as an example of a sport team. However, a sport team is not limited to a baseball team, but may be, for example, a soccer team, a football team, etc. In addition, instead of a sport team, a sport player in a non-team game, such as boxing may be applied.

Fourth Embodiment

FIG. 15 is a block diagram illustrating a configuration of an information output device according to a fourth embodiment of the present invention. In a same manner as in the first embodiment, the information output device according to the present fourth embodiment is applied not only to a car navigation device and to a portable navigation device (PND) movable with a vehicle, but also to a mobile terminal, etc. movable with a person.

The information output device illustrated in FIG. 15 includes a receiver 41, a database update processing unit 42, a database 43, a position acquisition unit 44, a map data storage 45 for storing data of a map, a determination processing unit 46, a favorite artist setting processing unit 47, a favorite artist retention unit 48, an operation unit 49, an information display 50, a data portion decode processing unit 56, a sound playing unit 57, an amplifier 58, a speaker 59, and a header portion decode processing unit 60.

In the information output device according to the first embodiment, the favorite team setting processing unit 17 can set a favorite team that a user likes from among sport teams. In contrast, in the information output device according to the present fourth embodiment, the favorite artist setting processing unit 47 can set a favorite artist (generally referred to as "favorite artist") whom a user likes from among artists, such as a singer and a player.

Then, once a favorite artist is set by the favorite artist setting processing unit 47, when music of the favorite artist is being broadcasted in a broadcasting channel different from a broadcasting channel that is being outputted from the speaker 59, the information output device can notify the user of the broadcasting of the music. Herein, an advantage and application resulting from setting of a favorite artist, etc. are described, for example, in United States Patent Application Publication No. 2008/0045170.

Next, each component of the information output device will be described. Herein, the position acquisition unit 44 (GPS reception processing unit 44a and self-vehicle position calculation processing unit 44b), map data storage 45, and determination processing unit 46 (self-vehicle position belonging administrative district specification processing unit 46a and favorite artist determination processing unit 46b) are similar to the position acquisition unit 14 (GPS reception processing unit 14a and self-vehicle position calculation processing unit 14b), map data storage 15, and determination processing unit 16 (self-vehicle position belonging administrative district specification processing unit 16a and favorite team determination processing unit 16b) described in the first embodiment, respectively. In addition, the favorite artist setting processing unit 47, favorite artist retention unit 48, and operation unit 49 are similar to the favorite team setting processing unit 17, favorite team retention unit 18, and operation unit 19 described in the first embodiment, respectively. Accordingly, the following describes components other than the above components.

The database 43 includes a music title database 43a and an artist database 43b. Information that associates an artist with music of the artist is stored in the music title database 43a.

FIG. 16 is a diagram illustrating part of information stored in the artist database 43b. As illustrated in FIG. 16, information similar to the team information 13e described in the first embodiment, that is, information (sometimes referred to as "association information") that associates an administrative district (region), such as a country, prefecture, city, town, and village on a map, with an artist (object) related to the administrative district and an ID of the artist (artist ID) is stored in the artist database 43b.

In the association information, an artist who is likely to be set as a favorite artist when the information output device is located in a certain administrative district is associated with the administrative district. Alternatively, in the association information, an artist who is likely to be set as a favorite artist when a user lives in a certain administrative district is associated with the administrative district. Herein, association of an administrative district with an artist may be any form when some effect is obtained by a certain artist being set as a favorite artist, such as convenience and enjoyment being generated on a user side, or some advantage being generated on a content provider side.

Herein, as an example of an administrative district to be associated with an artist, an administrative district such as a hometown of the artist, a region that has a connection with the artist, a place that has a connection with representative music of the artist, a region where popularity of the artist is particularly high, or a region where a provider of broadcasting content or music particularly wants to improve the popularity of the artist (a region decided as a target of commerce) shall be applied.

The database update processing unit 42 updates information stored in the music title database 43a and the artist database 43b by using a method of loading data from a removable storage medium (such as a CD-ROM), or a method of loading data from a server in a facility outside a vehicle via wireless communication. Herein, the information stored in the music title database 43a and the artist database 43b is usually updated (supplied) by a content provider or a provider side of the information output device. However, these pieces of information may be set and changed by user operation.

Returning to FIG. 15, the position acquisition unit 44 detects a self-vehicle position in a same manner as the position acquisition unit 14 according to the first embodiment. In a same manner as the determination processing unit 16 according to the first embodiment, the determination processing unit 46 specifies an administrative district corresponding to the self-vehicle position acquired by the position acquisition unit 44, and determines an artist associated with the specified administrative district in the artist database 43b as a favorite artist to be set by the favorite artist setting processing unit 47.

The favorite artist setting processing unit 47 sets a favorite artist (desired object) from among artists (objects). Herein, in a same manner as the favorite team setting processing unit 17 according to the first embodiment, the favorite artist setting processing unit 47 sets the artist determined by the determination processing unit 46 as a favorite artist.

The receiver 41 receives a wireless signal including various pieces of information, such as music data, from outside. Then, the receiver 41 acquires digital-format information by applying demodulation, etc. to the wireless signal, and outputs sound data (such as music data) and a header contained in the acquired information to the data portion decode processing unit 56 and the header portion decode processing unit 60, respectively. Herein, the receiver 41 acquires the header contained in the digital-format information about all broadcasting channels that can be received.

The data portion decode processing unit 56 outputs the sound data contained in the digital-format information from the receiver 41 to the sound playing unit 57, and the sound playing unit 57 generates a sound signal from the sound data. The amplifier 58 amplifies the sound signal generated by the sound playing unit 57, and the speaker 59 outputs a sound (such as music) based on the amplified sound signal.

The header portion decode processing unit 60 acquires the above-described header of all the broadcasting channels from the receiver 41, and acquires an artist ID contained in the header.

The information display 50 includes a display processing unit 50a and a display 50b. Herein, the display processing unit 50a determines whether music of the favorite artist is being broadcasted in a broadcasting channel different from a broadcasting channel that is outputted from the speaker 59 based on the above-described artist ID in all the broadcasting channels. When determining that music of the favorite artist is being broadcasted in the different broadcasting channel, the display processing unit 50*a* displays the broadcasting of the music in the display 50*b*.

The above-described information output device according to the present fourth embodiment specifies the administrative district corresponding to the position acquired by the position acquisition unit 44, and determines the artist associated with the specified administrative district in the artist database 43*b* as an artist to be set by the favorite artist setting processing unit 47. Accordingly, as in the first embodiment, since an artist who is likely to coincide with a favorite artist can be automatically set as a favorite artist even if a user does not set a favorite artist manually, it is possible to facilitate setting of a favorite artist.

Herein, in the association information illustrated in FIG. 16, one administrative district (one region) is associated with one artist (object) related to the administrative district. However, the association information is not limited to this example. As in the third variation of the first embodiment, one or more administrative districts or meshes (one or more regions) may be associated with one artist related to the administrative districts or the meshes.

In addition, when an administrative district having a connection with an artist is applied as an administrative district associated with the artist, since it is possible to set an artist who has a connection with each region one after another as a favorite artist as a self-vehicle moves, the information output device is expected to enhance enjoyment.

In contrast, popularity or the like of an artist often differs depending on a country. Accordingly, when the information output device is used in a very wide range, such as in a case where the administrative district is a country as a unit and the association information (FIG. 16) is used in a plurality of countries, it is effective to apply an administrative district where popularity of the artist is high as an administrative district associated with the artist.

In addition, in the above description, as operation after a favorite artist is set, when music of the favorite artist is broadcasted in a broadcasting channel different from a broadcasting channel of a sound outputted from the speaker 59, the display 50*b* displays the broadcasting of the music. However, the operation is not limited to this example. For example, when the information output device includes a recording medium that stores sound data (music data), the information output device may allow sound data, such as music of the favorite artist, to be played. When the information output device is configured in this way, it is possible to facilitate playing of music of the favorite artist.

Fifth Embodiment

In a fifth embodiment of the present invention, as illustrated in FIG. 17, for each administrative district, information that indicates degree of popularity of an artist in numerical data, that is, popularity information that establishes ranking of an artist in order of degree of popularity (popularity) is stored in the artist database 43*b*. Herein, in the information output device according to the present fifth embodiment, components identical or similar to components described in the fourth embodiment are provided with identical symbols, and description will focus on a different point.

The above-described determination processing unit 46 according to the fourth embodiment determines an artist associated with the specified administrative district in the artist database 43*b* as a favorite artist to be set by the favorite artist setting processing unit 47.

In contrast, the determination processing unit 46 according to the present fifth embodiment determines a plurality of artists associated with the specified administrative district in the artist database 43*b* as candidates for favorite artists to be set by the favorite artist setting processing unit 47. Then, the information display 50 arranges the plurality of artists determined by the determination processing unit 46 in order of degree of popularity (popularity) indicated by the above-described popularity information, and displays the artists.

FIG. 18 is a diagram illustrating display of the information display 50 according to the present fifth embodiment. Herein, part (a) of FIG. 18, part (b) of FIG. 18, and part (c) of FIG. 18 illustrate display in the information display 50 when the information output device is located in administrative districts of a region A, a region B, and a region C, respectively.

For example, in the popularity information illustrated in FIG. 17, since degree of popularity decreases in order of an artist C, an artist B, an artist D, and an artist A in the region A, as illustrated in part (a) of FIG. 18, the information display 50 displays the artist C, the artist B, the artist D, and the artist A in a line from top to bottom. Herein, as illustrated in part (b) of FIG. 18 and part (c) of FIG. 18, display similar to that in the region A is also performed in the region B and the region C.

The favorite artist setting processing unit 47 sets an artist selected by operation (for example, pushing down of an artist name on a screen) in the operation unit 49 from a user from among artists displayed in the information display 50 as a favorite artist.

Since the above-described information output device according to the present fifth embodiment displays the artist in order of popularity, the user can easily know an artist who is likely to coincide with the favorite artist. In addition, the user can easily know a difference of degree of popularity depending on a region.

In addition, the information output device according to the present fifth embodiment sets an artist selected by operation of the user, etc. from among artists displayed in the information display 50 as described above as a favorite artist. Therefore, since the user can set a favorite artist from among artists who are likely to coincide with the favorite artist, it is possible to facilitate setting of a favorite artist.

Herein, in the above fourth and fifth embodiments, setting and display of a favorite artist of a user from among artists has been described. However, the information output device is not limited to this example, but may be configured to perform setting and display of music that a user likes, in a same manner as setting and display of a favorite artist.

Herein, arbitrary combination of each embodiment, and variation and omission of each embodiment of the present invention can be appropriately made within the scope of the invention.

REFERENCE SIGNS LIST

11, 41 receiver, 13, 43 database, 14, 44 position acquisition unit, 16, 46 determination processing unit, 17 favorite team setting processing unit, 20, 50 information display, 31 license-plate-information acquisition unit, 47 favorite artist setting processing unit.

The invention claimed is:
1. An information output device movable with a vehicle, comprising:

a database that associates a region on a map with an object related to said region and to store the region and the object;
an address acquisition unit that acquires an address data from a smart plate of said vehicle;
a setting processing unit that sets a desired object from among said object; and
a determination processing unit that specifies said region corresponding to the position indicated by said address data acquired from said smart plate of said vehicle and determines said object associated with the specified region in said database as one of said object to be set by said setting processing unit and a candidate for the object.

2. The information output device according to claim 1, wherein
said database establishes ranking of said object and stores the object for each of said region, and
the information output device further comprises: an information display that displays in a line said object determined by said determination processing unit according to said ranking.

3. The information output device according to claim 2, wherein
said object is one of an artist and music, and
said ranking is order of popularity of one of said artist and music.

4. The information output device according to claim 2, wherein
said setting processing unit sets an object selected by operation from among said object displayed in said information display as said desired object.

5. The information output device according to claim 1, wherein
said object is one of a sport team and a sport player,
the information output device further comprises:
a receiver that receives information from outside; and
an information display that displays the information received by said receiver; and
when said receiver receives information indicating game progress of one of the sport team and sport player set by said setting processing unit, said information display changes a display mode of the information depending on the game progress.

6. The information output device according to claim 1, wherein
said determination processing unit specifies said region and determines said object to be set by said setting processing unit or said candidate for the object every time said vehicle moves a predetermined distance.

* * * * *